US012539467B2

(12) United States Patent
Prakash

(10) Patent No.: US 12,539,467 B2
(45) Date of Patent: Feb. 3, 2026

(54) AUTO CAPTURING OF COMPUTER GAME VIDEO TO GENERATE ADDITIONAL VIDEO

(71) Applicant: Sony Interactive Entertainment Inc., Tokyo (JP)

(72) Inventor: Ramana Prakash, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 288 days.

(21) Appl. No.: 18/315,342

(22) Filed: May 10, 2023

(65) Prior Publication Data

US 2024/0375014 A1 Nov. 14, 2024

(51) Int. Cl.

| | |
|---|---|
| ***A63F 13/77*** | (2014.01) |
| ***A63F 13/497*** | (2014.01) |
| ***A63F 13/67*** | (2014.01) |

(52) U.S. Cl.

CPC ............ *A63F 13/77* (2014.09); *A63F 13/497* (2014.09); *A63F 13/67* (2014.09)

(58) Field of Classification Search

CPC .......... A63F 13/40; A63F 13/50; A63F 13/60; A63F 13/61; A63F 13/63; A63F 13/70; A63F 13/71; A63F 13/77; A63F 13/79; A63F 13/80

See application file for complete search history.

(56) References Cited

U.S. PATENT DOCUMENTS

| | | | | |
|---|---|---|---|---|
| 9,852,053 | B2 * | 12/2017 | Verkoeyen | G06F 11/3696 |
| 11,794,109 | B2 * | 10/2023 | Benedetto | A63F 13/86 |
| 2009/0011838 | A1 | 1/2009 | Miyamoto | |
| 2009/0113303 | A1 * | 4/2009 | Goossen | G06F 11/3476 463/43 |
| 2011/0107220 | A1 | 5/2011 | Perlman | |
| 2021/0086083 | A1 * | 3/2021 | Aghdaie | A63F 13/67 |
| 2022/0138077 | A1 | 5/2022 | Ozel et al. | |

OTHER PUBLICATIONS

"International Search Repot and Written Opinion", dated Oct. 28, 2024, from the counterpart PCT application PCT/US24/28278.

Guglielmi et al., "Towards Using Gameplay Videos for Detecting Issues in Video Games", in Proceedings of MSR '22: Proceedings of the 19th International Conference on Mining Software Repositories (MSR 2022).

* cited by examiner

*Primary Examiner* — Omkar A Deodhar

(74) *Attorney, Agent, or Firm* — Kilpatrick Townsend & Stockton LLP

(57) ABSTRACT

A computer game video may be automatically captured and used for generating additional video related to gaming which can be beneficial to both game developers and to players. For example, automatically captured game video may be used for debugging and development purposes so that problematic portions of computer games are altered to remove the problems by generating new video versions of the games. In addition or alternatively, portions of games may be automatically captured and used to generate videos exhibiting special or extraordinary gaming performance.

20 Claims, 5 Drawing Sheets

AUTO CAPTURING OF COMPUTER GAME VIDEO TO GENERATE ADDITIONAL VIDEO

FIELD

The present application relates generally to auto capturing of computer game video to generate additional video.

BACKGROUND

Computer game videos can be captured as players play computer games.

SUMMARY

As understood herein, computer game video may be automatically captured and used for generating additional video related to gaming which can be beneficial to both game developers and to players. For example, automatically captured game video may be used for debugging and development purposes so that problematic portions of computer games are altered to remove the problems by generating new video versions of the games. In addition or alternatively, portions of games may be automatically captured and used to generate videos exhibiting special or extraordinary gaming performance.

Accordingly, a system includes at least one computer medium that is not a transitory signal and that in turn includes instructions executable by at least one processor assembly to automatically capture at least one computer game video, and use at least a captured portion of the computer game video to generate at least one additional video.

In example embodiments the instructions may be executable to use the captured portion of the computer game video for debugging and development purposes by altering at least one portion of the at least one computer game video. In such examples, the instructions can be executable to detect that plural players are not able to complete a first activity in the computer game video, and responsive to detecting that plural players are not able to complete the first activity in the computer game video, request at least one client computer to capture at least a portion of the computer game video associated with the first activity. The instructions may be executable to determine, from the portion of the computer game video captured by the client computer, at least one issue in the computer game video requiring correction, and correct the issue at least in part by providing at least one replacement computer video to at least one computer video player.

The issue can include one or more of a software bug, at least one incorrect configuration, at least one segment of a computer game that is difficult.

In other implementations the instructions can be executable to use the captured portion of the computer game video to generate at least one video exhibiting special or extraordinary gaming performance. In such cases the instructions may be executable to generate the video exhibiting gaming performance and provide the video exhibiting gaming performance to plural computer gamer systems.

In another aspect, a method includes automatically capturing at least one computer game video, and using the computer game video for generating additional video related to gaming that is beneficial to both game developers and to players.

In another aspect, an apparatus includes at least one processor assembly configured to automatically record at least a portion of at least one video generated by play of at least one computer game, and use the portion that is automatically recorded to generate a new video.

The details of the present application, both as to its structure and operation, can be best understood in reference to the accompanying drawings, in which like reference numerals refer to like parts, and in which:

DETAILED DESCRIPTION

Figure 1:
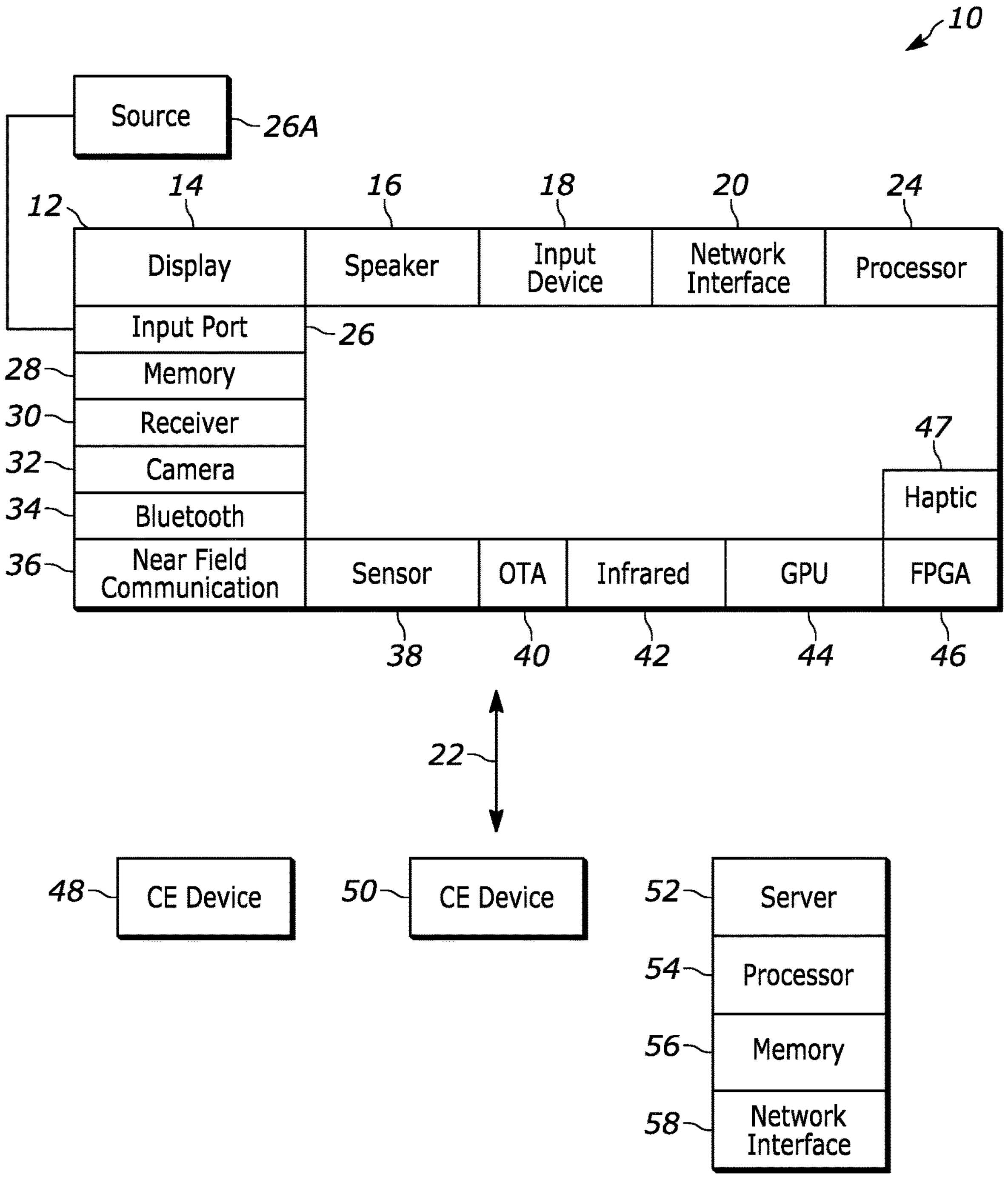
FIG. 1 is a block diagram of an example system including an example in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers. A processor assembly may include one or more processors acting independently or in concert with each other to execute an algorithm.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source **26*a* of audio video content. Thus, the source 26*a* may be a separate or integrated set top box, or a satellite receiver. Or the source 26*a* may be a game console or disk player containing content. The source 26*a* when implemented as a game console may include some or all of the components described below in relation to the CE device 48**.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated, expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. However, a preferred network contemplated herein is a generative pre-trained transformer (GPTT) that is trained using unsupervised training techniques described herein.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
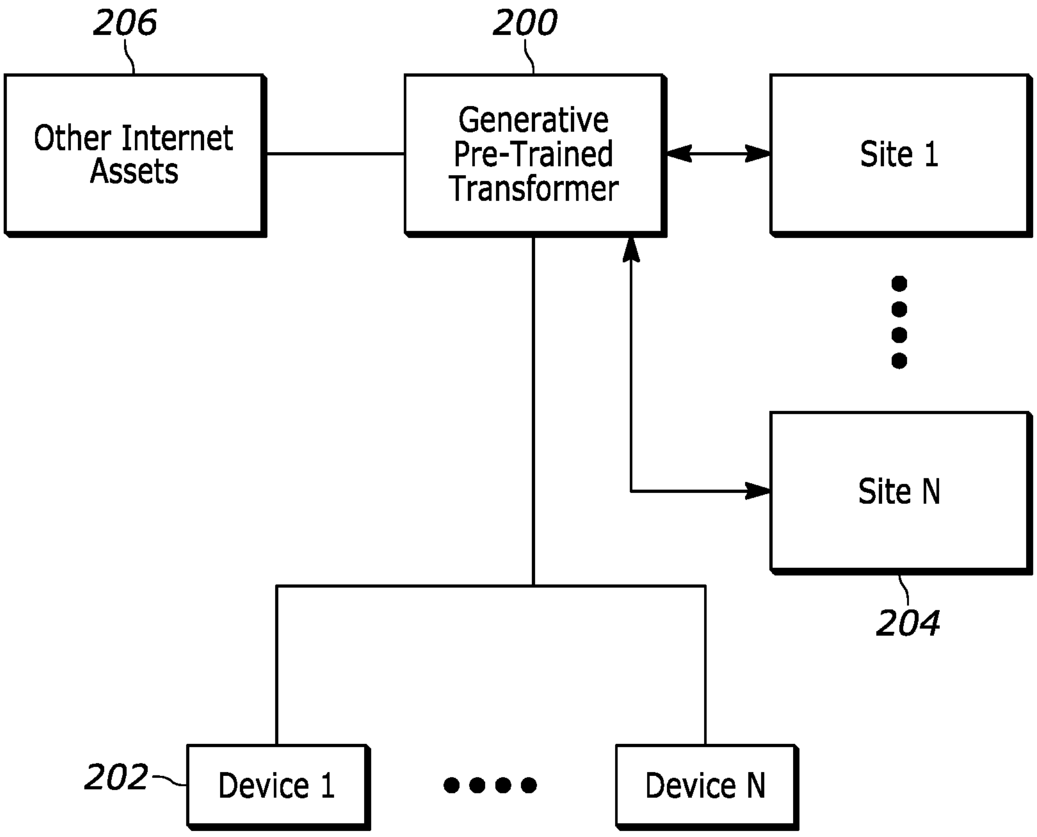
FIG. 2 illustrates a game advice system employing a generative pre-trained transformer (GPTT) consistent with present principles.

Turning to FIG. 2, in general, a generative pre-trained transformer (GPTT) 200 such as may be referred to as a "chatbot" receives queries from user computer devices 202 and based on being trained on a wide corpus of documents including gamer comments on various sites 204 such as social media sites as well as other Internet assets 206, returns a response in natural human language either spoken or written.

Figure 3:
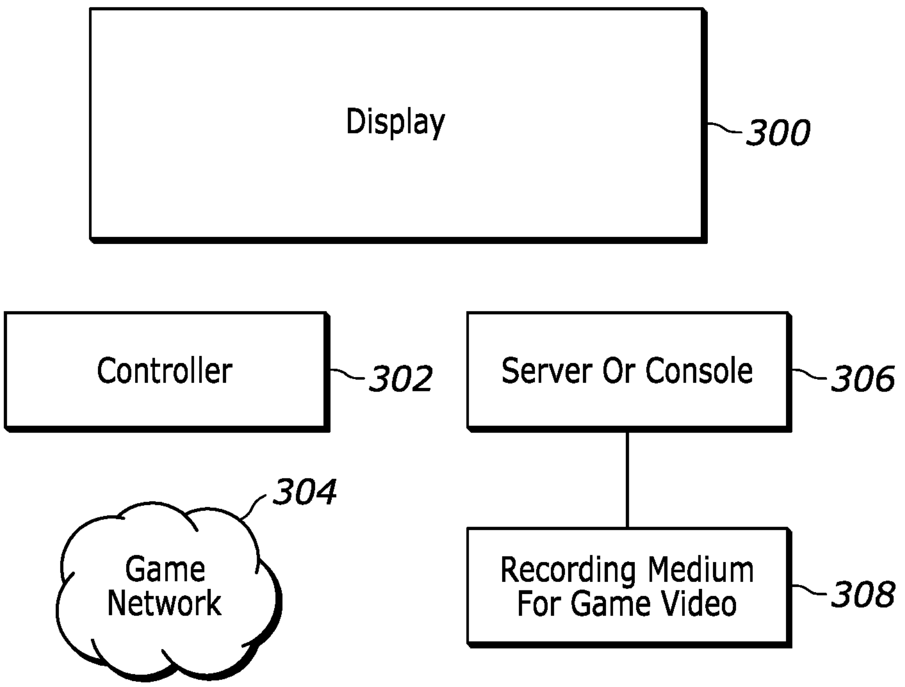
FIG. 3 illustrates an example system consistent with present principles.

FIG. 3 illustrates an example system consistent with present principles. A computer game may be presented on a video display 300 and controlled using one or more video game controllers 302. The game may be sourced from a computer game network 304 via the Internet and/or a server or computer game console 306. A recording medium 308 may be connected to the source of the computer game to record some or all of game play video presented on the display 300.

Figure 4:
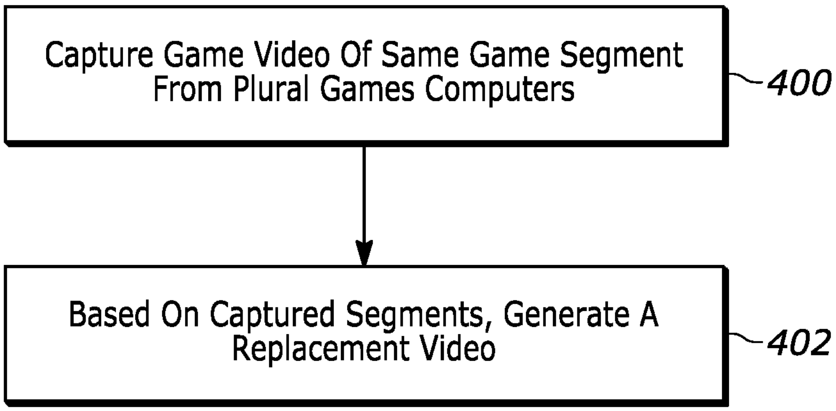
FIG. 4 illustrates example overall logic in example flow chart format.

FIG. 4 illustrates example overall logic in example flow chart format. Commencing at block 400, a segment or portion of the video generated by play of the computer game in FIG. 3 is captured automatically, i.e., recorded automatically on, e.g., the medium 308 in FIG. 3. Preferably, the same segment or portion of computer game video is automatically captured from plural gamer computers.

Proceeding to block 402, based on the captured segments of game play video, a replacement video is generated.

Figure 5:
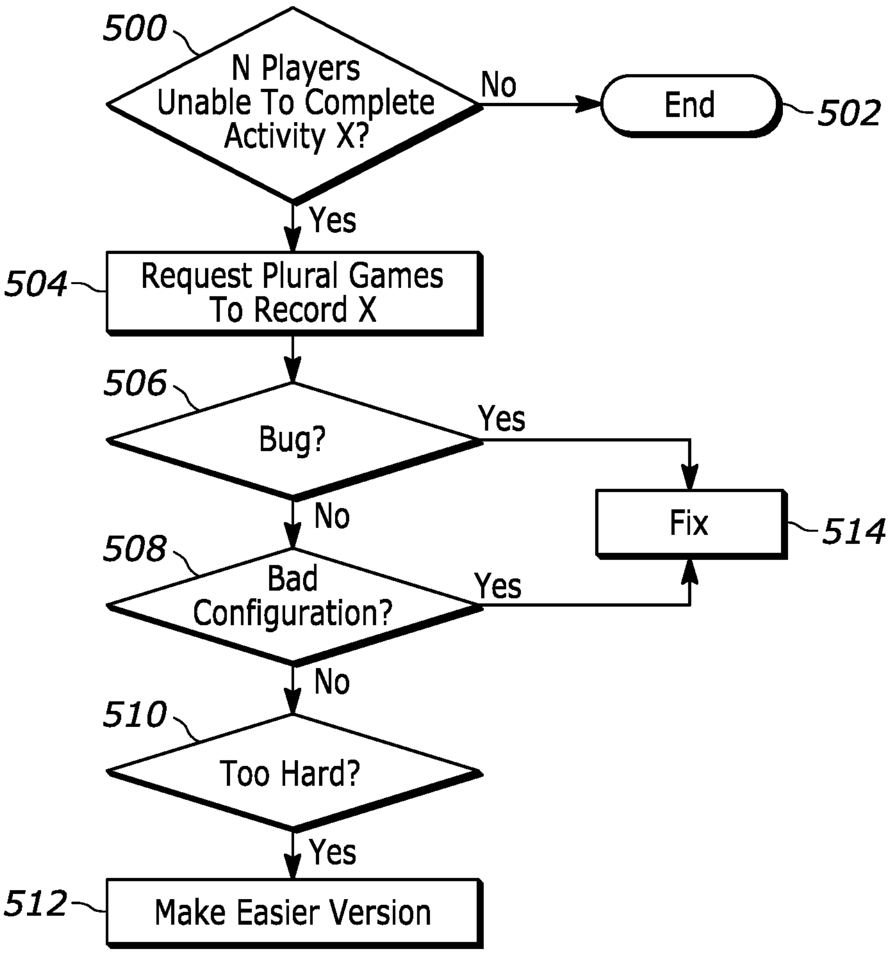
FIG. 5 illustrates example specific logic in example flow chart format.

FIG. 5 illustrates example specific logic in example flow chart format. Commencing at state 500 it is determined whether N players of N respective computer game portions whose videos were automatically captured were unable to complete a particular activity demanded by the computer game. "N" may be an integer greater than one. Note that "N" may represent a percentage of players who fail to complete the activity, e.g., two prevent of all players. This detection can happen either on the client or the server backend.

If not, the logic may end at state 502, but if at least N players of N respective computer game portions (or a threshold percentage of players) whose videos were automatically captured were unable to complete a particular activity demanded by the computer game, the logic may move to block 504 to request additional recordings of the portion or segment from additional game systems associated by computer gamers.

Based on the cumulative recordings of the segment or portion of the computer game play video it is determined at state 506 if the difficulty was caused by a software flaw or bug in the game. This may be done manually by a game expert examining the computer game code or by a machine learning (ML) model examining the computer game code. In the latter case the ML model may be trained on good and bad code to recognize bugs in software.

Additionally, state 508 indicates that it may be determined whether the difficulty was caused by an error in system configuration. This may be done manually by a game expert examining the computer game code or by a machine learning (ML) model examining the computer game code. In the latter case the ML model may be trained on good and bad configurations.

Yet again, state 510 indicates that it is determined whether the difficulty was caused by the computer game being too difficult during the portion or segment of game play that was captured. This may be done manually by a game expert examining the computer game code or by a machine learning (ML) model examining the computer game code. If it is determined that the problem is a game sequence that is simply too hard, the logic may move to block 512 to cause manual or automatic creation (using, e.g., a ML authoring or generative model) of an easier version of the computer game, which may then be disseminated to gamers.

Reverting to states 506 and 508, in the event that the difficulty is caused by a software bug or an erroneous system configuration, the problem is fixed in the code or system at block 514 and the resulting corrected version of the game is disseminated to gamers.

Thus, after determining the root cause of the difficulty, the game developer can then fix, tweak, or hide the activity depending on the situation. This would result developers determining issues faster, resolving them quicker and keep their players from churning out of the game.

Figure 6:
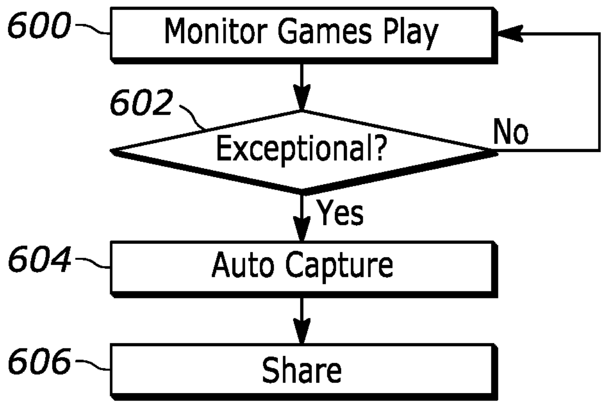
FIG. 6 illustrates example alternate logic in example flow chart format.

FIG. 6 illustrates example alternate logic in example flow chart format. Commencing at block 600, game play is evaluated by a human monitor or by an automated system that may be implemented by a ML model. State 602 indicates that a determination is made as to whether game play was exceptional in the monitored play from block 600. This may be done by determining whether a number of boss kills exceeded a threshold, indicating superior skill, whether time to complete a certain task was shorter than a threshold, indicating superior skill, whether a player character (PC) survived longer than a threshold, indicating superior skill, a number and/or content of spectator comments exceeding a threshold, indicating superior skill, and other heuristics. Video of exceptional game play and/or video of game play ensuing the exceptional game play by the same player is captured automatically at block 604 and shared with other gamer systems at block 606.

Thus, present principles facilitate autocapture of normal activities for players when they achieve something special or extraordinary. In this way, the best players moments is captured on the system and then either shared those to the relevant user's profile as a top achievement/accomplishment and/or share to a social network as user generated content strand. The clips of exceptional play may be sold on a game system store sire. Videos of exceptional play can generate excitement and interest for others to try to match that performance. Seeing the content on the game system store is equally important because users see players in the community playing the game and playing it well, which is in enticement to purchase the game.

Figure 7:
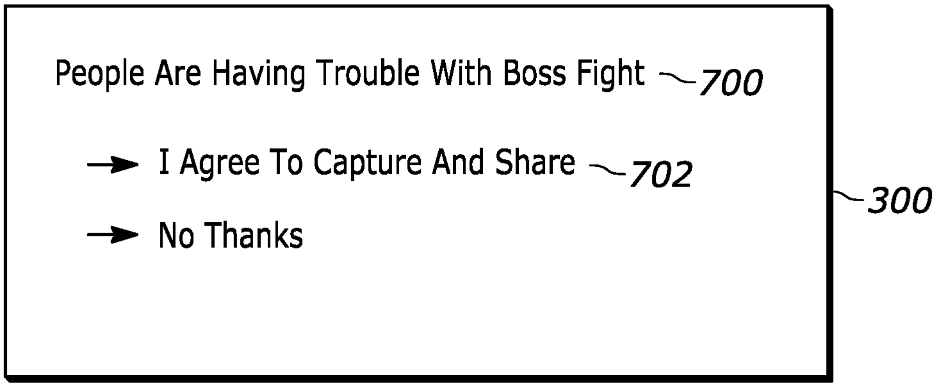
FIG. 7 illustrates an example screen shot consistent with FIG. 5.

FIG. 7 illustrates an example screen shot consistent with FIG. 5. An advisory 700 is presented on a gamer display 300 that a particular part of a computer game (in the example shown, a boss fight) is giving players trouble in completing. Selectors 702 may be presented allowing a user to select whether to allow automatic capture of video of his game play during the problematic segment or portion of the game or not.

Figure 8:
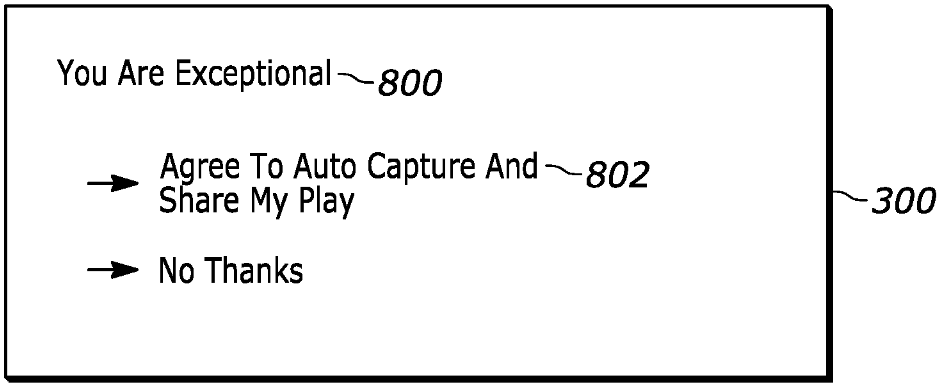
FIG. 8 illustrates an example screen shot consistent with FIG. 6.

FIG. 8 illustrates an example screen shot consistent with FIG. 6. An advisory 800 is presented on a gamer display 300 that a particular part of a computer game is playing exceptionally. Selectors 802 may be presented allowing a user to select whether to allow automatic capture and sharing of video of his game play or not.

While the particular embodiments are herein shown and described in detail, it is to be understood that the subject matter which is encompassed by the present invention is limited only by the claims.

What is claimed is:

1. A system comprising:

at least one computer medium that is not a transitory signal and that comprises instructions executable by at least one processor assembly to:

automatically capture at least one computer game video, wherein the at least one computer game video is automatically captured from a user device upon execution of a video game by the user device; and use at least a captured portion of the computer game video to generate at least one additional video from at least one different user device.

2. The system of claim 1, comprising the at least one processor assembly.

3. The system of claim 1, wherein the instructions are executable to use the captured portion of the computer game video for debugging and development purposes by altering at least one portion of the at least one computer game video.

4. The system of claim 1, wherein the instructions are executable to use the captured portion of the computer game video to generate at least one video exhibiting special or extraordinary gaming performance.

5. The system of claim 3, wherein the instructions are executable to:

detect that plural players are not able to complete a first activity in the computer game video;

responsive to detecting that plural players are not able to complete the first activity in the computer game video, request at least one client computer to capture at least a portion of the computer game video associated with the first activity;

determine, from the portion of the computer game video captured by the client computer, at least one issue in the computer game video requiring correction; and correct the issue at least in part by providing at least one replacement computer video to at least one computer video player.

6. The system of claim 5, wherein the issue comprises at least one software bug.

7. The system of claim 5, wherein the issue comprises at least one incorrect configuration.

8. The system of claim 5, wherein the issue comprises at least one segment of a computer game that is difficult.

9. The system of claim 4, wherein the instructions are executable to generate the video exhibiting gaming performance and provide the video exhibiting gaming performance to plural computer gamer systems.

10. A method comprising:

automatically capturing at least one computer game video, wherein the at least one computer game video is automatically captured from a user device upon execution of a video game by the user device; and using the computer game video for generating additional video related to gaming that is beneficial to both game developers and to players from at least one different user device.

11. The method of claim 10, comprising using the automatically captured computer game video for debugging and development purposes so that at least one problematic portion of at least one computer game is altered to remove the problematic portions by generating new video versions of a computer game from whence the computer game video was captured.

12. The method of claim 10, comprising using the automatically captured computer game video for generating videos exhibiting special or extraordinary gaming performance.

13. An apparatus, comprising:

at least one processor assembly configured to:

automatically record at least a portion of at least one video generated by play of at least one computer game, wherein the at least one computer game video is automatically captured from a user device upon execution of a video game by the user device; and use the portion that is automatically recorded to generate a new video from at least one different user device.

14. The apparatus of claim 13, wherein the processor assembly is configured to:

use the portion that is automatically recorded for debugging and development purposes by altering at least one portion of the at least one computer game.

15. The apparatus of claim 13, wherein the processor assembly is configured to use the portion that is automatically recorded to generate at least one video exhibiting special or extraordinary gaming performance.

16. The apparatus of claim 14, wherein the processor assembly is configured to:

detect that plural players are not able to complete a first activity in the portion that is automatically recorded;

responsive to detecting that plural players are not able to complete the first activity in the portion that is automatically recorded, request at least one client computer to capture at least a portion of the computer game associated with the first activity;

determine, from the portion of the computer game captured by the client computer, at least one issue in the computer game requiring correction; and correct the issue at least in part by providing at least one replacement computer video to at least one computer video player.

17. The apparatus of claim 16, wherein the issue comprises at least one software bug.

18. The apparatus of claim 16, wherein the issue comprises at least one incorrect configuration.

19. The apparatus of claim 16, wherein the issue comprises at least one segment of a computer game that is difficult.

20. The apparatus of claim 15, wherein the processor assembly is configured to generate the video exhibiting special or extraordinary gaming performance and provide the video exhibiting special or extraordinary gaming performance to plural computer gamer systems.

* * * * *